United States Patent [19]
Hawkins et al.

[11] 4,081,574
[45] Mar. 28, 1978

[54] MULTICHAMBER VAPOR DEPOSITION PROCESS

[75] Inventors: Albert W. Hawkins, Princeton, N.J.; Matthew J. O'Hara, Monroe, N.Y.; Frank P. Gortsema, Croton, N.Y.; Eddie Hedaya, White Plains, N.Y.

[73] Assignee: Union Carbide Corporation, New York, N.Y.

[21] Appl. No.: 723,030

[22] Filed: Sep. 13, 1976

Related U.S. Application Data

[62] Division of Ser. No. 565,944, Apr. 7, 1975, Pat. No. 3,998,180.

[51] Int. Cl.² .................. B05D 7/22; C23C 13/08
[52] U.S. Cl. .................. 427/237; 427/248 R; 427/400
[58] Field of Search .................. 427/237, 50–52, 427/69, 70, 99, 78, 91, 107, 124, 166, 167, 248–255; 118/49, 49.1, 50–50.1

[56] References Cited

U.S. PATENT DOCUMENTS

| | | | |
|---|---|---|---|
| 1,937,256 | 11/1933 | Taylor | 118/50 X |
| 2,222,630 | 11/1940 | Pickford et al. | 118/50 X |
| 2,749,255 | 6/1956 | Nack et al. | 427/252 X |
| 2,787,688 | 4/1957 | Hall et al. | 427/250 X |
| 3,233,579 | 2/1966 | Arvidsson | 118/50 |
| 3,801,360 | 4/1974 | Dahlgren | 118/50 X |

FOREIGN PATENT DOCUMENTS

| | | | |
|---|---|---|---|
| 1,354,561 | 1/1964 | France | 427/248 R |
| 1,188,896 | 3/1965 | Germany | 427/250 |

*Primary Examiner*—Morris Kaplan
*Attorney, Agent, or Firm*—William Raymond Moran

[57] ABSTRACT

An apparatus and process are provided for the safe, economic and pollution-free exposure of articles to reactive gaseous fluids to alter their surface characteristics. The articles are exposed to one or more fluids which are transferred back and forth from a reaction chamber to a holding chamber. As the fluids are transferred they pass through a trap designed to remove reaction-by-products without affecting valuable reactant fluids. Since the fluids can be transferred under vacuum and the overall reaction can take place at relatively low temperatures, the process provides a convenient and safe method for handling reactive fluids. The process is particularly useful for the halogenation, for example fluorination, of a variety of articles, such as plastic containers, aerosol bottles and films to improve their barrier resistance to solvents and gases.

9 Claims, 3 Drawing Figures

MULTICHAMBER VAPOR DEPOSITION PROCESS

This is a division of our prior U.S. application Ser. No. 565,944, filed Apr. 7, 1975, now U.S. Pat. No. 3,998,180.

In its broad aspect this invention relates to a process for exposing a variety of articles to reactive fluids to alter their surface characteristics. In one aspect, this invention is directed to a process for the halogenation of a variety of articles which is safe, economic and pollution-free. In a further aspect, this invention relates to the fluorination of plastic containers, aerosol bottles and films to improve their barrier resistance to solvents and gases.

A variety of processes and processing equipment are disclosed in the literature relating to the exposure of compositions and articles to reactive fluids whereby their physical and/or chemical properties are altered. For example, the direct halogenation, particularly fluorination, of polymers and polymeric articles is known. By direct fluorination is meant exposure of objects to fluorine gas, either pure or diluted with inert or reactive diluents and additives. In contrast, there is extensive additional art on fluorination of non-polymers, such as organic compositions, metals and the like, or the reaction of materials with fluorinating agents which do not contain elemental fluorine such a hydrogen fluoride, sulfur tetrafluoride, and the like. The literature covers both mechanical and chemical aspects, such as halogenation equipment and its fabrication as well as a wide variety of chemical processes.

Direct fluorination is usually carried out by two methods. In the first, the object, or chamber containing the object, is full of one gas and that gas is gradually displaced by passing in fluorine. In the second general method, the chamber or object is evacuated then fluorine is bled in gradually. Both methods are disclosed in U.S. Pat. No. 2,811,468 which issued Oct. 29, 1957 to S. P. Joffre. In either method, the fluorine which passes through or remains after reaction is flushed out to an absorber or scrubber for disposal. There are no provisions for recycling and reusing valuable unreacted fluorine, nor provisions for removing hydrogen fluoride or reaction-by-products from the fluorine during recycling.

Among the types of apparatus disclosed for fluorination is that illustrated in Pinsky, et al, Modern Packaging, 33, P. 130 (1960). This reference shows two tanks which are used independently as a flow-through or as a one-tank vacuum apparatus. Fluorine is not transferred back and forth in the apparatus disclosed.

In another literature article by G. C. Straty and R. Prydz, Rev. Sci. Instrum., 41 (8), 1223–7 (1970), there is described an apparatus for accurate measurements of pressure-temperature-volume behavior of fluorine. Fluorine gas is transferred back and forth between compartments by conventional vacuum line techniques using liquid nitrogen cooling to create suction. Since the intent of the study is to determine pressure-temperature-volume realtionships of fluorine, no provision was made for carrying out any reaction in the apparatus. Indeed, every attempt was made to avoid reaction.

Several other references disclose fluorination apparatus. In general, however, these are devices for contacting hydrogen fluoride or fluorine with nuclear fuels to dissolve them, or for reacting uranium with fluorine to make uranium hexafluoride gas. Liquid or fluidized bed flow-through units are common; however, fluorine consumption is large and no recycle systems were disclosed.

Extensive chemical literature also exists on chlorination and, more generally halogenation of polymers. Most is addressed to thorough chlorination of finely divided resin to produce chlorinated polyethylene or chlorinated polyvinyl chloride resin. Gas phase fluidized bed and liquid phase reactions are common. A free radical initiator or UV light is often added.

Since the aim of the chlorination reactions is different, the apparatus and process do not correspond to that used for surface fluorination as hereinafter described.

Several U.S. patents have been granted on technology for treating plastic containers with $SO_3$ to reduce permeation of organic liquids through the walls. For example, see U.S. Pat. Nos. 2,832,699; 2,937,066; 3,542,746; 3,586,569; 3,592,724; and 3,613,957.

The process of this invention provides numerous advantages over the conventional approaches to direct fluorination as described in the literature for flow-through and single tank vacuum processes. In a flow-through apparatus, such as that of the type disclosed by the aforementioned Joffre patent, the objects to be surface treated are placed in a closed reaction chamber, containing air at atmospheric pressure and the air is displaced to the desired percentage by introducing the surface treatment gas to the interior of the reaction chamber. Since this is done by the gradual replacement of air within the reaction chamber by pressurized surface treatment gas, the object must be exposed to increasing percentages of surface treating gases in coming to the preferred percentage. It is also apparent that a quantity of treating gas will be wasted in flushing out some of the gas in the chamber. In this case, atmospheric air must be acceptable as being present during the treating cycle. If all air is to be excluded, then large quantities of treating gas must be used to purge the air from the chamber. It is apparent that the objects to be treated tend to be exposed to laminar flow of the treating gases.

In a multiple tank system air is removed by means of a vacuum to a predetermined pressure. In one preferred condition this is about 1 Torr absolute pressure, but the pressure is not narrowly critical.

The surface treating gas, contained within a holding chamber separate from the reaction chamber and composed of the desired percentages of treating gases can now be introduced into the reaction chamber through any controlled means so that the reaction chamber can be pressurized in a desired and controlled manner. The pressure conditions are a function of the volume of the treating gas holding tank, and the initial pressure in the reaction chamber. If it is desired (for safety) that the pressure never exceed 1 atmosphere in both the holding chamber and the reaction chamber, then the holding chamber and reaction chamber are made to be of essentially equal volumes. Pressure between the two chambers is then equalized by means of vacuum pumping. Also the holding tank can be lowered to a low absolute pressure for later transfer of the gas back from the reaction chamber to the holding chamber. Contact between the treating gas and object is easily made turbulent, permitting better contact of the entering reactants with all surfaces of the objects to be treated.

A further disadvantage for the flow-through systems described in the literature is that the exact desired time of exposure to a preferred mixture can be achieved only with difficulty. For instance, good mixing during displacement of air with a reactive gas could be prevented if objects are in the chamber. In contrast, in the present process atmospheric air is removed by means of a vacuum pump to a known pressure. Treating gas mixtures, prepared in advance and kept in the holding tank, can now be precisely introduced into the reaction chamber permitting controlled and determined reaction times. Since little gas remains to be displaced, there are no mixing problems.

Another disadvantage of the flow-through system is that all gases pass to a disposal unit. Either they must be discharged with no recovery or absorbed or chemically altered so that the desired gases can be recovered by regeneration or chemical treatment.

As described in this invention treating gases are removed from the reaction chamber to the holding chamber for later use. The surface-treating-gas-mixture can be brought to a desired vacuum in the reaction chamber so that the residual gas in the reaction chamber is at a low level.

An important part of the two chamber system is elimination of by-products. If by-products of the reaction are built up in the treating fluid, they may interfere with some part of the process. A "scrubber" or "trap", selective for by-products, can be installed in the transfer line between the chambers. Thus, the transfer step may include a "purification" step. An alternate concept may have the trap in a side "loop" through which reaction gases are circulated. Although this alternative is more complicated, and requires additional apparatus, it may be desired in some circumstances.

Both the flow-through system and the vacuum system can be purged with air or inert gas to permit safe access to interior of the reaction chamber. The waste gases and purge gases from all systems flow to an absorber or scrubber aimed at rendering them harmless before release to the environment, however, the use of a holding chamber in the two tank vacuum transfer system means that the exhaust gas scrubber need not treat so much gas as in the other approach. Thus, a smaller, more economical unit may be used. This feature also makes it much easier to assure that the waste gases emitted to the environment meet emissions standards.

It is therefore an object of this invention to provide a process for the exposure of a variety of articles to reactive fluids whereby their surface characteristics are altered. Another object of this invention is to provide an apparatus and process which is safe, economic and pollution-free. A further object is to provide a process for the halogenation of a variety of articles. A still further object is to provide a process wherein the reactant fluids are transferred to and from the reaction chamber by vacuum means. Another object of this invention is to provide a process which transfers reactants by means of a vacuum technique in which substantially elevated pressures of dangerous materials are never attained. Another object of this invention is to provide a process wherein reaction -by-products are removed and expensive reactant fluids are conserved. A further object is to provide an apparatus and process for the fluorination of plastic containers, aerosol bottles, films and the like.

Another object of this invention is to provide a method of introducing reactive gas mixtures from a holding chamber to a reaction chamber in a manner which controls pressure and volume. A further object is to provide a method for injecting reactive gas mixtures directly to the interior of large molded objects so that the reaction is at substantially atmospheric pressure and which minimizes the dilution of the reactive gas mixture with residual air normally contained within the molded object. A still further object is to provide a method of vacuum evacuation of large molded articles prior to exposure to a reactive fluid without collapse of the large article. Another object of this invention is to provide a process for containing a reactive fluid, such as fluorine gas, within the apparatus and thereby minimizing the possibility of the escape of the gas to the atmosphere. A further object is to provide a process whereby pressure build up by inadvertent rapid or violent reaction is safely released by passing the vented gases through scrubbers to render them non-hazardous. These and other objects will become apparent to those skilled in the art in the light of the teachings herein set forth.

In its broad aspect, this invention is directed to a process for exposing articles to reactive fluids to alter their surface characteristics. The apparatus utilized in the practice of the invention is comprised of:

a. a sealed holding chamber having conduit means connected to at least one source of fluid, and optionally, acess means for the introduction and removal of articles, b. a sealed reaction chamber having sealable access means for the introduction and removal of articles, c. second conduit means connecting the holding chamber and the reaction chamber, and d. transfer means disposed in the second conduit means and capable of creating a pressure differential between the holding chamber and the reaction chamber. The apparatus can also be equipped with pressure control means, means for monitoring the concentration of reactive components, and separation means of reaction-by-products.

The apparatus is conventionally employed for altering the surface characteristic of articles by exposing them to a fluid at an essentially pre-determined composition, wherein the fluid is comprised of, or contains, one or more components which are reactive with the surface of the articles. In essence, the process comprises the steps of:

a. admitting to an apparatus comprised of at least one holding chamber, and at least one reaction chamber, a fluid comprised of a known concentration of one or more components, b. admitting to a reaction chamber which has fluid transfer means to and from said holding chamber, one or more of the articles to be treated, c. adjusting the pressures in at least one of the holding and reaction cahmbers so that the pressure in the holding chamber is greater than the pressure in the reaction chamber.

d. allowing the pressure to equalize between the holding and reaction chambers by the transfer means and whereby fluid is transferred from the holding chamber to the reaction chamber, e. optionally, adjusting the pressure in at least one of the holding and reaction chambers so that the pressure in the reaction chamber is greater than the pressure in the holding chamber, f. allowing the components to react with the articles, g. optionally, allowing the pressure to equalize between the holding and reaction chamber by the transfer means and whereby the fluid is transferred to the holding chamber from the reaction chamber, h. adjusting the pressure in at least one of the holding and reaction chambers so that the reaction chamber is less than the pressure in the holding chamber, and thereafter, i. removing said articles from said reaction chamber.

A better understanding of the invention will be had by referring to the following description and changes wherein.

Figure 1:
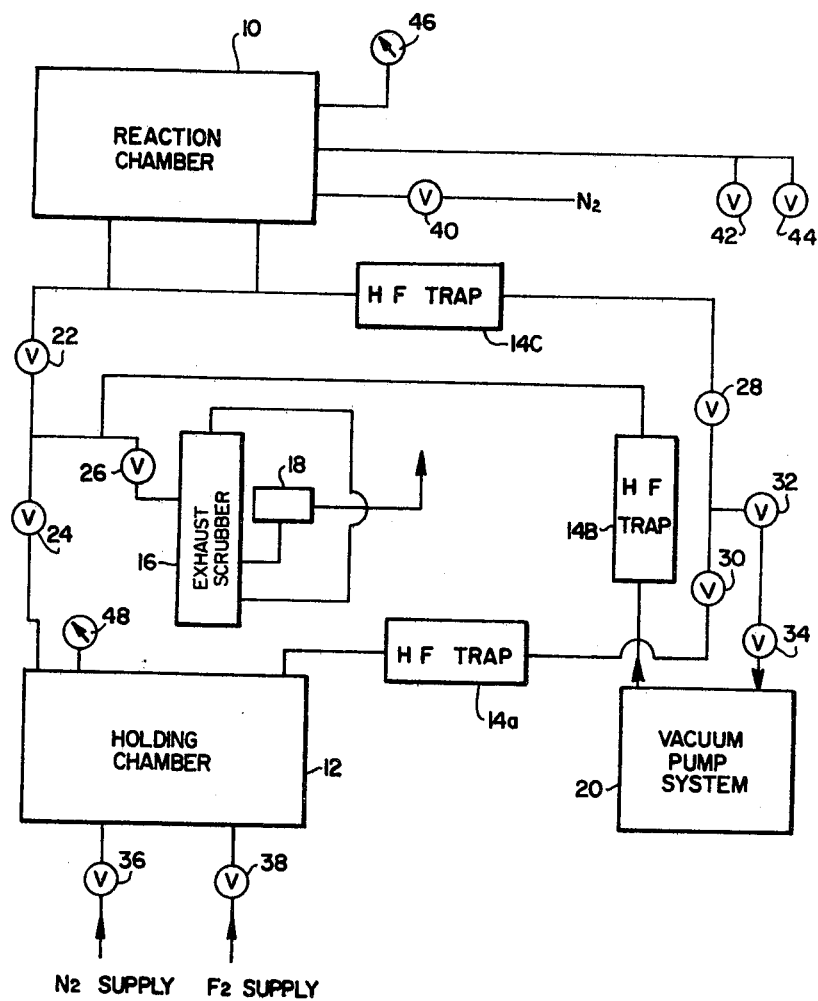
FIG. 1 is a schematic diagram of the apparaus and process of this invention

With reference to the drawings FIG. 1 is a schematic diagram of a simplified version of the apparatus of the invention.

Reaction chamber 10 is a cylindrical stainless steel vessel of approximately 16 inches inside diameter and 24 inches inside length. One end is closed by a circular door with a rubber sealing gasket. The chamber has a water jacket permitting heating or cooling of the chamber walls.

Holding chamber 12 is a stainless steel cylinder of approximately the same size as reaction chamber 10. In the examples it was chosen to be about 10 percent larger than the reaction chamber. Thus, when gas was initially transferred and pumped into the reaction chamber, the holding chamber did not have to be evacuated to near 1 Torr. Instead, it had only to be evacuated to approximately 70 Torr while the reaction chamber was pumped to 1 atmosphere. This procedure has the advantage that the vacuum pump is not pumping in its slowest, least efficient, low pressure range; as a result, the reaction chamber can be brought to 1 atmosphere of reactive gas more quickly.

When the reactive gas is fluorine one or more traps are employed to absorb hydrogen fluoride and by-products of the reaction. Hydrogen fluoride trap 14 can be located at one or more positions as indicated by 14a, 14b and 14c and is a stainless steel cylinder approximately 5 inches in diameter and 15 inches long. It was filled with pellets of sodium bifluoride, activated by heating with a nitrogen purge. It is thus apparent that several alternative locations for trap 14 are possible. For example, the trap can be located between chamber 10 and valve 28 as indicated by 14c. It is only important that the trap be situated so that the reactive fluid containing by-products can flow through the trap.

Effluent scrubber 16 is a vertical stainless steel cylinder approximately 6½ in diameter and 48 inches high. It contains circulating aqueous 20 percent potassium hydroxide solution through which the exhaust gases are passed. Drop catcher 18 removes droplets contained in the exhaust gases prior to venting to the atmosphere. Vacuum pump 20 aids in transferring the gases to and from reaction chamber 10 and can be comprised of, for instance, a combination of a piston-type pump and a Rootes-type blower as hereinafter described. Valves 22, 24, 26, 28, 30, 32 and 34 control the flow of the gases to and from holding chamber, reaction chamber, traps and scrubber. Valves 36, 38 and 40 control the entry of reactive and inert gases. Valves 42 and 44 permit monitoring of the gases in the reaction chamber. Additional monitoring valves, not shown, are also present to monitor the holding chamber. Gauges 46 and 48 monitor pressures within the reaction and holding chamber.

When fluorine or certain other components are the reactive fluid to be used in the process of this invention, it is necessary to "passivate" the apparatus. Passivation can be accomplished by the usual method known to those skilled in handling fluorine. That is, a small amount of fluorine at a low flow rate can be introduced into the apparatus and all surfaces exposed to gradually increasing concentration of fluorine until it ceases to react with the surfaces and passes through the apparatus unchanged.

In order to demonstrate the operation of the unit for one particular sequence of steps which can be employed, Chart A below shows the positioning of the valves. The sequence of operations described in Chart A is that normally used to operate the simplified apparatus shown in FIG. 1. Consideration of that drawing will reveal that alternate ways of carrying out the process are embodied in the apparatus. For instance, pressure equalization (Steps 6 and 9) could be carried out through valves 22 and 24 if desired. or through the vacuum pump. Thus, the process of using the apparatus is not to be limited by the specific series of steps shown in Chart A, but rather, is illustrative of the process of the invention. Also, during normal operation, Steps 3 through 14 may be repeated several times. If desired, samples of the reaction mixture may be taken at a sampling manifold attached to the reaction and/or holding chamber. It is also evident from a consideration of Chart A and FIG. 1 that in this particular simplified apparatus, in which the HF trap is located at 14a, HF and by-products are scrubbed from the gas mixture as the mixture passes from the holding chamber to the reaction chamber rather than the reverse. It is apparent that either procedure is feasible and the invention is not limited to either one.

In Chart A below the vacuum pump is on at all times during which the unit is operating. "C" indicates that the particular valve is closed and "O" that the valve is open.

CHART A

VALVE LOGIC DIAGRAM FOR SURFACE TREATMENT APPARATUS

| Operation | Valve: | Position of Valves and Door | | | | | | | Reaction Chamber Doors |
|---|---|---|---|---|---|---|---|---|---|
| | | 22 | 24 | 26 | 28 | 30 | 32 | 34 | |
| 1. Evacuate Holding Chamber | | C | C | O | C | O | O | O | C |
| 2. Fill Holding Chamber from F$_2$ and N$_2$ supplies | | C | C | C | C | C | C | C | C |
| 3. Load Reaction Chamber | | C | C | C | C | C | C | C | O |
| 4. Evacuate Reaction Chamber | | C | C | O | O | C | O | O | C |
| 5. Prepare to equalize pressure through HF trap | | C | C | C | C | C | C | C | C |
| 6. Equalize Pressure | | C | C | C | O | O | C | C | C |
| 7. Pump F$_2$ mixture into Reaction Chamber | | O | C | C | C | O | O | O | C |
| 8. Carry out Reaction | | O or C | C | C | C | C | C | C | C |
| 9. Equalize Pressure | | O or C | C | C | O | O | C | C | C |
| 10. Pump gases from Reaction Chamber to Holding Chamber | | C | O | C | O | C | O | O | C |
| 11. Fill Reaction Chamber with N$_2$ | | C | C | C | C | C | C | C | C |
| (Optional Settings) | | C | C | O | O | C | O | C | C |

CHART A-continued
VALVE LOGIC DIAGRAM FOR SURFACE TREATMENT APPARATUS

| Operation | Valve: | \multicolumn{7}{c}{Position of Valves and Door} | Reaction Chamber Doors |
|---|---|---|---|---|---|---|---|---|---|
| | | 22 | 24 | 26 | 28 | 30 | 32 | 34 | |
| 12. Pump Reaction Chamber Contents through Scrubber | | C | C | O | O | C | O | O | C |
| 13. Fill Reaction Chamber with $N_2$ | | C | C | C | C | C | C | C | C |
| 14. Remove Treated Objects | | C | C | C | C | C | C | C | O |

In practice, the process of this invention can be effected over a wide range of conditions. Although, for the most part, the operating conditions are not critical, care should be taken since the process involves the use of reactive and toxic gases.

The amount of reactive fluid, such as fluorine, employed can vary over a relatively wide range and is largely a factor of the article being treated. Hence, most any concentration of fluorine gas or other reactive fluid in another gas may be used provided the mixture can be safely prepared. Normally, a range of from 1 to 100 percent by volume has been found to be useful. However, the most preferred portion of this range for some processes is 5 to 80 percent. Under some circumstances, where "light" exposure is desired, concentrations as low as 0.001 percent fluorine (or other gas) or even lower may be desirable. The fluorine may be diluted with essentially inert gases such as nitrogen or helium. At higher concentrations of fluorine or other reactive fluids, reactions tend to be more violent and the apparatus may erode or react, so that where possible, lower concentrations are preferred.

A reactive gas such as fluorine may be mixed with one or more inert or reactive diluents. For example, fluorine can be mixed with oxygen, sufur dioxide, chlorine, bromine, nitrous oxide, a mixture of chlorine and oxygen, certain organic monomers and the like. Although, the materials of construction may vary depending upon the gases employed, the overall process is the same.

Although 1 Torr is preferrably the level to which the chamber is evacuated, the pressure is not narrowly critical. It is chosen by considering safety and economic factors such as the amount of residual gases released when the door is opened, or the amount of residual gas left to mix with the treating gas. For especially careful work, the chamber might be evacuated with elaborate pumping means to 0.001 Torr or less. A useful upper limit is about 700 Torr. The pressure most often useful is from about 0.1 to about 10 Torr.

For safety reasons it is often desirable to keep a chamber containing reactive gases at less than 1 atmosphere pressure so that any leaks are inward. Thus, use of vacuum as a gas transfer means is a particularly attractive safety feature. However, to accelerate the reaction, pressure may be raised to as high as 600 psig (of fluorine) or higher, with some risk of excessively violent reactions. The preferred range is from about 0.1 to about 2 atmospheres.

Preferred temperature conditions for conducting the process of this invention (when the reactive fluid is fluorine gas) are within the range of from about 0° to about 100° C. Higher temperatures might be used for articles such as those composed of graphite, wherein temperatures as high as 700° or 800° C. could be used. A particularly preferred temperature range for plastic articles is from about room temperature to about 80° C. This range will be generally useful for other fluids but may vary in some cases, depending on the reactivity of the fluid.

The temperature range is not narrowly critical and will be limited by the tendency toward excessive reaction at high temperature, and of slow reaction or condensation or freezing of the reactive fluid at low temperature.

The desired treatment time at the aforementioned temperatures is not narrowly critical. For treatments with fluorine as shown in examples, times from 0.5 to 50 minutes are preferred. If extensive fluorination reaction is desired, hours or days may be used. Conversely for "light" treatments, a few seconds of exposure or even fractions of a second may be sufficient. These treatment times can include the time required to adjust the reaction chamber to a constant pressure. However, in the examples the times indicated refer only to the time at which the reaction chamber is at the constant pressure.

As hereinbefore indicated the apparatus can be utilized for the treatment of a wide variety of articles. For example, articles comprised in whole or in part of inorganic, or organic materials or combinations thereof can be treated by the process and in the apparatus of this invention. The apparatus can, for example, be used to "passivate" metal tubing before installing the tubing in other fluorination apparatus.

In a preferred embodiment the invention is directed to a process for treating plastic articles with elemental fluorine, and inert or reactive diluents, for the purpose of altering their surface characteristics. The invention is particularly applicable to articles comprised of, in whole or in part, polymeric organic compositions. For example, containers of high and low density polyethylene, polypropylene, polybutylene, polystyrene, and a great variety of other organic polymers can be treated. Illustrative polymers include poly(vinyl chloride), cellulose acetate and even partially fluorinated materials such as poly (vinyl fluoride). In addition to plastic bottles and containers, films (rolled or flat), plaques, tanks, drums, aerosol containers, extruded solid shapes, gloves, tires, fibers and other plastic articles can be treated. Also, textiles, fabrics, clothing, paper, cardboard and the like can also be treated to alter their properties, in particular, surface characteristics.

With suitable adjustment of treatment conditions (from mild to severe) to suit the article being treated and properties desired, almost any solid composition such as plastic, metal, paper, fabric, and the like and some liquid compositions may be treated by the process of this invention. Limitations on substances or articles would include difficult handling due to fluidity, vapor pressure (evaporation during evacuation would be undesirable) and the like. However, it is the major purpose to treat organic solids and polymeric solids.

It is also apparent from consideration of the invention that very large or very small objects of a variety of sizes and shapes might be treated. To further visualize the treatment of such objects, FIGS. 2 and 3 depict other embodiments of this invention.

Figure 2:
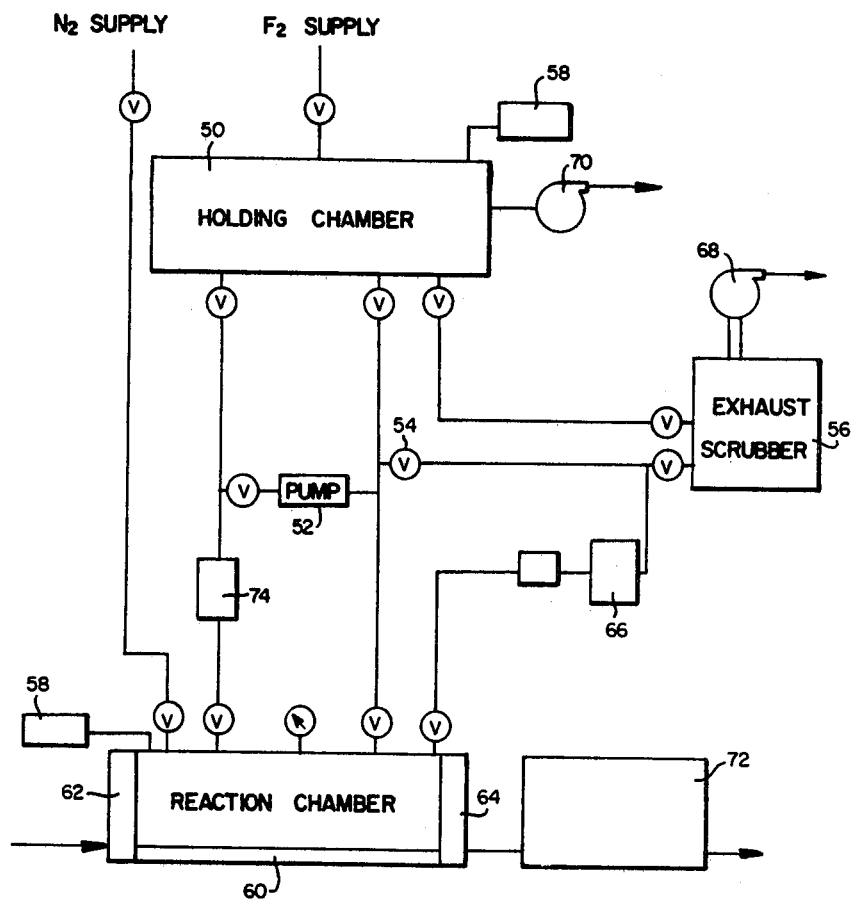
FIG. 2 is a schematic diagram of a production scale treating unit.
Figure 3:
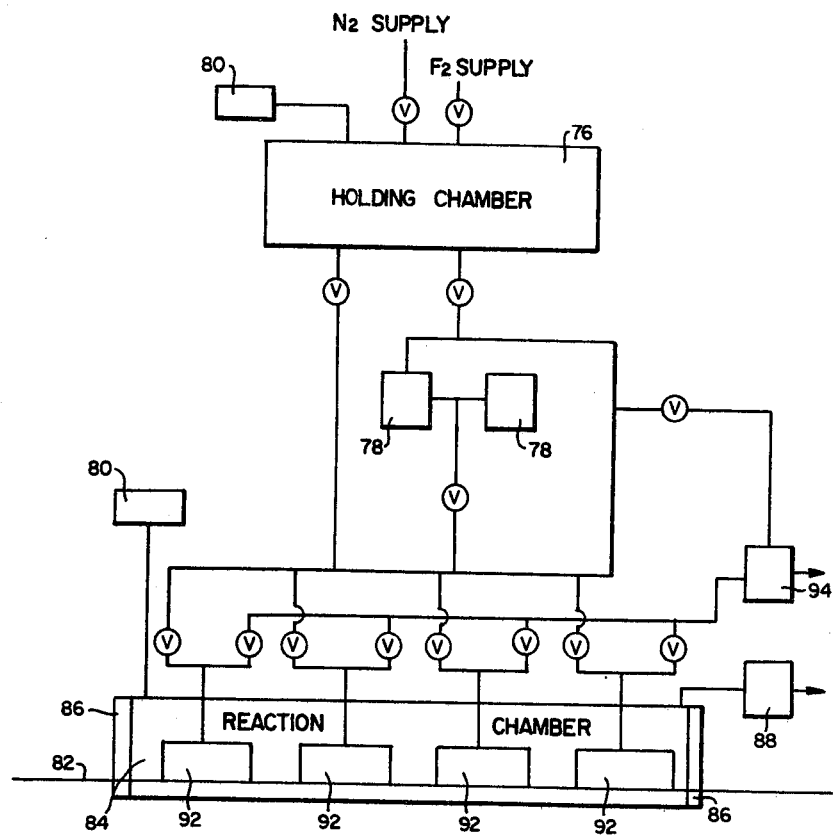
FIG. 3 is a schematic diagram of a production scale unit useful for treatment of the interior of large objects.

FIG. 2 is a schematic diagram for a production scale treating unit. To start the operation the air in gas mixture holding chamber 50 is evacuated by vacuum pump 52 through valve 54 and to atmosphere through the scrubber column 56. Fluorine and nitrogen are then expanded into holding chamber 50 from known volume cylinders. The gas mixture is analyzed by instrument 58, and the chamber 50 is now at atmospheric pressure.

The objects to be fluorinated are in position on the transfer device ready to move into the reaction chamber 60, and the unit is now in the ready position. To load chamber 60 door 62 opens to admit new product and door 64 opens to permit the treated objects to leave. These doors are interlocked so that pump 66, blower 68 and fan 70 must be running before the doors can be opened. The transfer device now loads new objects into reaction chamber 60 and unloads treated objects to wash chamber 72. The transfer device may include hand loading.

Air is now evacuated from chamber 60 through the proper sequence of valves and by vacuum pump 66. This air evacuation sequence continues until the pressure in chamber 60 is lowered to approximately 1 Torr. At the end of this period the proper valves open and the gas mixture contained in chamber 50 enters chamber 60 so that both chamber 50 and chamber 60 are at ½ atmospheric pressure.

During the next sequence and through the proper valves the atmosphere in chamber 50 is transferred to chamber 60 so that 60 is at atmospheric pressure and chamber 50 is under vacuum. Pump 52 is used for this transfer. At the end of this period the fluorine gas mixture is allowed to dwell within chamber 60, for instance, for 60 seconds.

At the end of this dwell period, the procedure is reversed and the fluorine atmosphere is allowed to flow back to evacuated chamber 50 through an HF trap 74 so that again both are at approximately ½ atmospheric pressure. Next the atmosphere remaining in chamber 60 is pumped back to chamber 50 through an HF trap 74, so that this chamber returns to atmospheric pressure and the pressure in chamber 60 goes to approximately 1 Torr.

A final period is allowed to continue evacuation of chamber 60 to the scrubbing system through the vacuum pumps. Dry air can be purged into the chamber to effect further dilution of residual gas if this proves necessary.

As mentioned previously, this description is a description of the general process. Modifications as described later will suit particular objects to be fluorinated. For example, large volume items, such as tanks or 55 gallons drums could be treated by directly loading the fluorine atmosphere to the inside of the container. Film could be treated in an essentially atmospheric condition within the reaction chamber 60. Small containers could be treated essentially as described. In a production operation all valves can be automatically sequenced so that once the process begins all steps will follow in programmed steps.

With further reference to FIG. 2, reaction chamber 60 is designed to operate from approximately 1 Torr absolute pressure to 200 psig. At each end of the chamber are automatic doors which at the proper time open to permit objects to enter and leave. The doors are arranged to permit the chamber to go to 1 Torr, and the preferred maximum operating pressure is one atmosphere, but approximately 2-3 atmospheres (14.7-29.4 psig) may be used. One reason for operating at pressures down to 1 Torr is that only a small amount of fluorine or hydrogen fluoride need be removed in a purge step.

As with all hardware items in the apparatus, the suitable materials of construction are not narrowly critical. As is well known to these skilled in the art, exposure of many metals to gradually increasing levels of $F_2$ concentration "passivates" the metal surfaces making them resistant to further reaction with fluorine. Thus, metal items may be iron, steel, aluminum, copper, brass, or stainless steel. Where high temperatures are expected (over 100°-200° C), monel metal, nickel or high nickel content alloys are preferred.

Flexible gaskets can be made of rubbers or of fluorinated elastomers such as VITON TM or FLUOREL TM. Plastic parts are frequently made of TEFLON or KEL-F plastics. Only where factors other than fluorine contact must be considered must other limitations be made on materials. For instance, a liquid scrubber for HF and $F_2$, mentioned below, would not be made of a material that reacts with alkali such as aluminum.

Wash Chamber 72 is an adjunct to the main part of the invention and may not be always needed. In FIG. 2, it is immediately behind and adjacent to chamber 60. In it, the product is water-washed for a period of several minutes to remove traces of fluorine or HF. This chamber also can be traversed by an indexing conveyor which at the end of the cycle time can move the product out of the wash chamber to be placed in inventory. Materials of construction are not narrowly critical and can be plastic or stainless steel.

Gas Holding Chamber 50 is essential to the invention. This is a tank designed to approximately equal the capacity of reaction chamber 60. It serves as the holding tank for the gas atmosphere. The atmosphere is equalized when desired between chamber 60 and gas holding chamber 50 through appropriate valving and connecting means.

Materials of construction and design pressures are the same as for the reaction chamber; no doors are needed. Alternatively, the holding chamber could resemble the reaction chamber, providing two reaction chambers.

Vacuum pumps 66 and 52 are designed to evacuate chamber 60 from atmospheric pressure to approximately 1 Torr absolute. Various pumping times (1 second to 30 minutes) may be suitable in particular cases. Any suitable means of creating vacuum may be used, including dry or oil sealed vacuum pumps and cryogenic or absorption pumps. If oil-sealed pumps are used, a halogenated or fluorinated pump fluid is preferred. Oil sealed pumps are often not suitable because of reaction between the oil and the reactive fluid. A dry piston pump (e.g., Corken Pump) and a Roots-type pump are also suitable. A single pump could also replace pumps 66 and 52.

Any suitable means of trapping HF but not $F_2$ may be used. Such a trap is an important part of the invention unless the amounts formed are so small as not to interfere with the process or apparatus. One example common in the art is a sodium bifluoride pellet packed-bed, filled with $NaF \cdot HF$ which can be activated by heating while being purged with $N_2$. Refrigerated traps may be used. As known in the art, HF absorbed by such traps can be recovered by heating the trap. Materials of construction are not narrowly critical, but nickel and its alloys are preferred.

The scrubbing system 56 described in this disclosure, for use with the subject apparatus, is a convenient and economical means of disposing of the small amount of objectionable gaseous fumes before emission from the vacuum transfer system. Such a means is necessary for safe non-polluting operation of the invention; however, the actual treatment of objects could be carried out without such a scrubber if the wastes were not toxic or undesirable.

While a scrubbing method is described below, it is obvious that other methods such as absorption, direct chemical reaction, or other means well known to the art could be employed to absorb noxious wastes.

FIG. 2 shows scrubbing system 56. The system is comprised of a stainless scrubbing tower for scrubbing the gas with an aqueous solution of sodium hydroxide. This solution is fed through the column through a distributor plate and flows concurrently with the gas atmosphere. The reacted stream (now containing sodium fluoride, air and sodium hydroxide) enters the holding tank containing the reservoir of sodium hydroxide. This holding tank is so designed that the air streams must enter the reservoir of sodium hydroxide. The air passes through this solution and out to atmosphere through the second column which is packed with suitable packing. Here the air travels countercurrent to a flow of sodium hydroxide and the remaining traces of fluorine are reacted to sodium fluoride. Other bases (e.g., KOH) will work.

Since the sodium fluoride is partially soluble in water, a stream of the reservoir can be taken to a lime treater where the sodium fluoride is converted to calcium fluoride and the sodium hydroxide regenerated. The calcium fluoride which is insoluble can then be passed to waste as a harmless salt.

FIG. 3 is a schematic diagram of one embodiment of the apparatus and process of this invention which is useful for treating the inner surfaces of relatively large objects, such as 55 gallon drums, gasoline tanks, and the like. A major difference between this embodiment and those previously described in that fluorine is added directly to the interior of the object. A major difference over the previous embodiment of FIG. 2 is the addition of a vacuum pump to equalize the pressure in the reaction chamber to avoid collapse of the object being treated.

With reference to FIG. 3 the process is conducted as follows: gas mixture holding chamber 76 is evacuated through vacuum pump 78. The fluorine and nitrogen are then expanded into chamber 76 from known volume cylinders. The gas mixture can be analyzed by instrument 80, and chamber 76 is approximately at atmospheric pressure. The large objects 92, for instance, polyethylene gasoline tanks, are in position on the indexing conveyor 82 and the unit is now in the ready position. Reaction chamber 84 is equipped with doors 86. These doors are interlocked so that pump 88 must be running before the doors can open. The conveyor is then operated so that the large objects move into proper position and the sequence begins. Air is now evacuated from the large objects through the proper sequence valves and by vacuum pump 94. At the same time vacuum pump 88 evacuates the air from the chamber in order to prevent collapse of the object due to pressure difference. This air evacuation sequence continues until the pressure in the large objects is lowered to about 1 Torr absolute. At the end of this period the proper valves open and the gas mixture contained in holding chamber 76 directly enters the large objects and air or another gas enters chamber 84 so that the pressure in both these objects and in chamber 76 equalizes at ½ atmospheric pressure. During the next sequence and through the proper valves, all of the atmosphere in chamber 76 is transferred to the large objects so that these objects are now at atmospheric pressure and chamber 76 is under vacuum. At the end of this stage the fluorine gas mixture is allowed to dwell within the large objects for e.g., 60 seconds. During all stages of the process, the pressure in reaction chamber 84 can be controlled to a suitable differential between itself and the large objects to minimize leakage, collapse or expansion.

At the end of this dwell period the procedure is reversed, the proper valves open and the fluorine atmosphere is allowed to flow back to evacuated chamber 76 so that again both are at ½ atmospheric pressure. Next the atmosphere remaining in the large objects is pumped back to chamber 76, so that this chamber returns to atmospheric pressure and the large objects are at 1 Torr absolute. Suitable pressure is maintained in chamber 84 by pump 88.

After this stage, the objects are evacuated and gases pass to the scrubbing system through vacuum pump 94. Again suitable pressure is maintained in chamber 84. The unit is now ready for the second loading operation, the doors open, the treated large objects move into the wash chamber and the second cycle begins.

As previously indicated an important aspect of this invention is to move fluorine safely and economically from one chamber initially at or near 1 atmosphere pressure to another, at or near 1 torr. After treatment, the transfer must be reversed. Obviously, a pressure equalization suffices for one half of the pressure change. To pump the remaining fluorine, an oil sealed vacuum pump of any of several mechanical types such as sliding vane, rotary piston, and the like could be considered. Any such pump would be suitable if the gas to be transferred were not so reactive as fluorine, for instance, air or nitrogen. However, even the very inert "Halocarbon" oils are often not suitable for fluorine contact in such applications, as they decompose or explode.

By combining a dry (non-oily) piston-type compressor having low friction piston rings such as graphite rings or TEFLON rings, with a dry (non-oily) vacuum pump, specifically a Rootes-type blower the pressure can be reduced to 1 Torr. By specially modifying the valves, the piston compressor has been made to act as a high quality vacuum pump capable of pumping down to 25–50 Torr; the Rootes Blower in series with it covers the remaining range and pumps down to approximately 1 Torr. A Rootes blower by itself cannot pump over the required pressure range. Thus, depending on the exact pumping characteristics of the piston pump, chamber size, pumping times, and other factors, either one Rootes pump or two in series may be used together with the piston pump. Use of all Rootes pumps would normally not be practical or economical. At least four would be needed in series and the high pressure ones must be very large and expensive.

As previously indicated, and as set forth in the examples, several desirable properties can be imparted to articles treated in the apparatus and by the process of this invention. For the most part, treatment of the articles provides modifications in their surface properties.

For example, these include reduced permeability to some types of organic liquids such as xylene, gasoline, and the like. Permeability to oxygen is also reduced. Ability to accept printing inks can be enhanced. Chemical composition of the surface can be altered. Other properties might be conferred or removed, depending on the objects or treatment fluids to be used.

In the following examples, testing for gas permeation rates was carried out by a method described by Brubaker and Kammermeyer in Anal. Chem., 25, 424-426, 1953, with the modifications set forth below. The principle used was identical to the one cited in the article, that is, measuring the permeated gas rate at conditions of constant temperature and pressure, by displacing a liquid in a capillary column. The exit end of the capillary column opens into laboratory ambient conditions. The entrance end of the liquid filled capillary is connected to the low pressure (permeate) side of a supported membrane or film. On the other side of the membrane, a high pressure of gas, typically 100 psig, ranging from 40 to 200 psig, is applied from a suitable source such as a pressurized gas cylinder and gas pressure regulator. Under these circumstances, gas permeates through the membrane or film and displaces liquid in the capillary tube. A calibrated pipette — volume chosen to match the flow rate — is used as the capillary, and the time rate of liquid volume displacement in the capillary is taken as the gas permeation rate. The formula in Brubaker and Kammermeyer is used to convert permeation rate to permeability constant. Because generally large changes in permeation rate are caused by the process of this invention, the very small percentage corrections for different barometric pressures and different room temperatures on different days were neglected.

The modifications of the reference process included the use of colored water in place of mercury as the liquid in the capillary tube. Additionally, in place of a vibrator, the capillary tube was tapped manually. A circular test area of 25.6 square centimeters was used and the film supported on sintered stainless steel. No screen or porous disk was put on the high pressure side of the film. Also the seal between the high pressure side of the permeation testing cell and the membrane was made by an O-Ring instead of a gasket. A short length of thick walled rubber tube connected the outlet of the low pressure side of the cell to the capillary tube.

Liquid permeation rates were typically measured by following the weight loss of a tightly capped container over a period of time.

The following examples are illustrative:

EXAMPLE 1

Into the reaction chamber of the apparatus shown in FIG. 1 were placed high density polyethylene bottles of one gallon capacity and also films of different polyethylenes, 1.2 to 4 mils thick and about 6 by 12 inches in size. In this example water at room temperature (approximately 23° C) was circulated in the heating jacket. After the door to the reaction chamber was closed, the chamber was evacuated to 1 Torr. During 5 seconds the chamber was filled to ½ atmosphere pressure with a mixture of fluorine and nitrogen (25% $F_2$ by volume) by equalizing pressure with a holding tank of approximately the same size, previously filled with approximately 1 atmosphere pressure of the gas mixture. Then the gas mixture from the holding tank was pumped into the treatment chamber during about 40 seconds, raising the pressure to approximately 1 atmosphere. These transfers occurred through the HF trap. The gas mixture was maintained in the treatment chamber for 1 minute, then gas was transferred from the reaction chamber to the holding tank, first by equalizing pressure then by pumping to evacuate the reaction chamber into the holding tank. After the treatment chamber was evacuated to 1 Torr, (during 2½ minutes), it was then filled with air again and evacuated again. The samples were removed and the permeation constants were measured as hereinbefore described. The results obtained on the films are set forth in Table I below:

TABLE I

PERMEATION CONSTANT TO METHANE, $P_{CH_4} \times 10^{12(1)}$

| | Before Treatment | After Treatment |
|---|---|---|
| 4 mil commercial LDPE[2] bag film | 283 | 80 |
| 1.2 mil LDPE (0.918 dens, 0.1 M.I.) | 534 | 24 |
| 1.5 mil HDPE[3] (0.96 dens, 0.8 M.I.) | 86 | 20 |

[1]Permeability constant in cc.-cm./sec.-cm.-cm.Hg(ΔP)
[2]Low Density polyethylene
[3]High Density polyethylene The high density polyethylene bottles were also tested to determine changes in permeability to gasoline, by filling them with approximately 2,800 grams of commercial grade gasoline, capping them tightly and weighing them periodically while they stood at room temperature. The results are set forth in Table II below:

TABLE II

GASOLINE PERMEATION LOSSES

| Bottle Treatment | Gasoline Lost After 26 Days at Room Temperature |
|---|---|
| None | 105 g |
| None | 106 g |
| 25% $F_2$ in $N_2$ at room temperature, 1 minute | 21 g |

EXAMPLES 2-6

An additional series of treatments were carried out in the same apparatus and in a similar manner as that set forth in Example 1. Hot water circulating in the reactor was maintained at a temperature of 66° C. After completion of the fluorination treatment the bottles, which were blow molded of high density polyethylene, were filled with approximately 50 grams of a 1/1 mixture of $CF_2Cl_2$ and $CFCl_3$ and capped with a crimped aerosol bottle valve. The bottles were molded to have a wall thickness at the thinnest part of at least 0.065 inch at the maximum diameter of 2¼ inches in order to easily contain the pressure of 37.5 psig at room temperature where the tests were carried out. Two bottles were treated at each temperature except for Example 6, where only one was treated. The results obtained are set forth in Table III below:

TABLE III

PERMEATION LOSSES OF FLUOROCARBON PROPELLANTS AT ROOM TEMPERATURE

| Example | Treatment Condition | Grams Lost in 5 Days |
|---|---|---|
| 2 | Not Treated | 0.094 g, 0.107 g |
| 3 | 25% $F_2$ in $N_2$, 1 min. 60° C | 0.0008 g, 0.004 g |
| 4 | 25% $F_2$ in $N_2$, 10 min. 65° C | 0.0014 g, 0.0017 g |
| 5 | 25% $F_2$ in $N_2$, 1.5 min. 0.5 Atm. pressure 65° C | 0.007 g, 0.0017 g |
| 6 | 50% $F_2$ in $N_2$, 1.5 min | |

TABLE III-continued

| PERMEATION LOSSES OF FLUOROCARBON PROPELLANTS AT ROOM TEMPERATURE | |
|---|---|
| Example Treatment Condition | Grams Lost in 5 Days |
| 0.33 Atm. 65° C | 0.0023 g |

Examples 3-6 show that 25% fluorine at pressures from 0.33 atm. to 1 atm. can be used in the apparatus to produce a useful change in the properties of the treated objects. In Examples 5 and 6, run at reduced pressure, no time was required after pressure equalization to pump up the reaction chamber. For these, the procedure was modified to eliminate the pump-up stage and the treatment time was lengthened from 1.0 to 1.5 minutes.

EXAMPLES 7-14

An additional series of experiments were performed using the apparatus and procedures employed in the previous examples. As in Example 1, 1 gallon high density polyethylene bottles were used. The treated bottles were also filled with about 2,800 grams of gasoline and the weight loss noted over a period of time. Different temperatures and pressures were used to demonstrate the utility of the apparatus at different conditions. In these examples, the apparatus was used with 10%, 25% and 50% $F_2$, at pressures from $\frac{1}{3}$ atm to 1 atm, at room temperature and 66° C. Treatment time is the time at which the gas mixture is held in contact with the objects after the desired pressure is obtained and before the gas mixture is transferred back to the holding tank. The results are set forth in Table IV below:

TABLE IV

| ROOM TEMPERATURE GASOLINE PERMEATION RESULTS | | | | | |
|---|---|---|---|---|---|
| | Fluorination Conditions | | | | |
| Example | % $F_2$ Mix By Volume | Time | Temp. | Pressure | Gasoline Wt. Loss (g) at 26 Days |
| 7 (control) | | Not Treated | | | −105 g |
| 8 (control) | | Not Treated | | | −106 g |
| 9 | 10% $F_2/N_2$ | 1 min. | RT | 1 atm | − 37 g |
| 10 | 25% $F_2/N_2$ | 1 min. | RT | 1 atm | − 21 g |
| 11 | 25% $F_2/N_2$ | 10 min. | 66° C | 1 atm | − 2 g |
| 12 | 25% $F_2/N_2$ | 1 min. | 65° C | 1 atm | − 3 g |
| 13 | 25% $F_2/N_2$ | 1½ min. | 65° C | ½ atm | − 22 g |
| 14 | 50% $F_2/N_2$ | 1½ min. | 65° C | ⅓ atm | − 12 g |

EXAMPLE 15

A 5 gallon high density polyethylene drum was placed into the treatment chamber and treated with fluorine gas by the method employed in Example 1. The water jacket temperature was maintained at 62° C. and a fluorine concentration of 25 percent in nitrogen was employed. The treatment time was 2 minutes at 1 atmosphere. When the drum was removed from the treatment chamber, a slight dulling of surface gloss compared to that of an untreated drum showed that reaction with fluorine occurred.

EXAMPLE 16

A commercially available wide mouth, 8 ounce polycarbonate bottle was treated with fluorine by the method employed in Example 1. The water jacket temperature was maintained at 62° C and a fluorine concentration of 25 percent in nitrogen was employed. The treatment time was 2 minutes at 1 atmosphere. After removal from the treatment chamber, the treated bottle showed a slightly iridescent surface, displaying "interference colors", showing that the surface had reacted with fluorine.

EXAMPLE 17

Films of several different high and low density polyethylene material ranging in thickness from 1.1 to 1.7 mils and density from 0.915 to 0.96 gm/cm³ were clamped to a metal framework, placed in the chamber and treated according to the method of Example 1. The films were exposed to 10 percent fluorine in nitrogen at 60° C for 5 minutes. Fluorination was evident from weight gains of the films of from 1 to 1.5 percent. Infrared spectral examination of the film also showed the appearance of absorption at approximately 1100-1200 cm$^{-1}$ due to the presence of C—F bonds.

EXAMPLE 18

Pieces of unfinished tanned leather—sheepskin, patent leather, boot leather, and dress shoe leather— were placed in the treatment chamber and treated by the method of Example 1, with the following specific conditions: 5% $F_2$ in $N_2$, 60° C jacket temperature, and 5 minute exposure time. Evidence of reaction noticeable on the samples removed from the reactor included curling, slight yellowing or discoloration and increased wettability when a drop of water was placed on the surface.

EXAMPLE 19

In order to demonstrate the use of the apparatus of this invention for halogenation with other than fluorine, a polyethylene bottle is treated with chlorine.

Into a chamber with a well-sealable closure is placed a polyethylene bottle. By suitable means (vacuum pumps, refrigeration, etc.) the chamber is evacuated to 1 Torr. $Cl_2$ is allowed to flow into the reaction chamber through suitable connecting piping and valves from a holding chamber containing $Cl_2$ gas. Stainless steel or nickel and high nickel alloys such as Monel metal or Hastelloy are preferred for construction. Enough of the remaining $Cl_2$ in the holding tank is pumped into the reaction chamber which is maintained at 100° C to attain 2 atmospheres pressure. Optionally, a UV light illuminates the polyethylene bottles to initiate chlorination. After 10 minutes exposure, the unreacted chlorine and by-product HCl are permitted to flow to and then are pumped to the holding chamber via a scrubbing system containing $KMnO_4$ to absorb HCl and $P_2O_5$ to absorb $H_2O$. The reaction tank is flushed with dry nitrogen (exhausting to an aqueous NaOH scrubber) to absorb residual gases, pumped out once again if desired, filled with air, opened and the chlorinated objects removed.

EXAMPLE 20

In order to demonstrate that the apparatus of this invention is useful for treating objects with sulfur trioxide the following experiment is conducted.

Into a chamber at 60° C. with a closure is placed a polyethylene bottle. By suitable means (vacuum pumps, refrigerator, etc.) the chamber is evacuated to 1 Torr. Nitrogen containing 20% $SO_3$ gas is allowed to flow into the reaction chamber through suitable connecting piping and valves from a heated holding tank containing the $N_2$, $SO_3$ mixture Stainless steel or nickel and high nickel alloys such as Monel metal, or in some cases, aluminized steel, are preferred for construction. Enough of the remaining $SO_3/N_2$ in the holding tank is pumped into the reaction chamber which is maintained at room temperature to attain 1 atmosphere pressure. After 10 minutes exposure, the unreacted $SO_3$ is permitted to flow to and then is pumped to the holding chamber via a scrubbing system containing $CaSO_4$ or $MgSO_4$ to absorb any $H_2O$ present or introduced with the sample bottle. The reaction tank is flushed with dry nitrogen or air (exhausting to an aqueous NaOH scrubber) to absorb residual gases, pumped out once again if desired, filled with air, opened and the sulfonated objects removed.

Although the invention has been illustrated by the preceeding examples, it is not to be construed as being limited to the materials employed therein, but rather the invention is directed to the generic area as hereinbefore disclosed. Various modifications and embodiments can be made without departing from the spirit and scope thereof.

What is claimed is:

1. A process for altering the surface characteristic of articles by exposing them to a gaseous fluid of an essentially predetermined composition wherein said fluid is comprised of one or more components which are reactive with the surface of said articles, said process comprising the steps of:
    a. admitting said fluid comprised of a known concentration of said one or more components to an apparatus comprised of at least one sealed reaction chamber and at least one sealed holding chamber, each of said chambers having sealable access means for the optional introduction of at least one of said articles, whereby said holding chamber may optionally be utilized as only a holding chamber for said fluid or additionally as a second reaction chamber;
    b. establishing a conduit system communicating said chambers and utilizing vacuum means therewith for selectively creating pressure differentials between said chambers whereby said fluid is transferred between said chambers and each chamber is alternately evacuated or charged with said gaseous fluid;
    c. synchronizing a feed and discharge of said articles with respect to said evacuating and charging in said chambers whereby to effect said altering of surface characteristics; and
    d. in conjunction with said fluid transfer, separating out reaction by-products and contaminants.

2. The process of claim 1 wherein said reaction chamber prior to removing said each articles is decontaminated.

3. The process of claim 1 wherein said articles are disposed in each reaction chamber so that said fluid contacts only the interior of said articles.

4. The process of claim 3 wherein each reaction chamber is maintained at a pressure essentially equal to that of the interior of said articles.

5. The process of claim 1 wherein said component is at least one halogen.

6. The process of claim 1 wherein said component is fluorine.

7. The process of claim 2 wherein said component is fluorine.

8. The process of claim 1 wherein said component is at least one interhalogen.

9. The process of claim 1 wherein said component is sulfur trioxide.

* * * * *